CONNECTOR WITH AUTOMATICALLY CONTROLLED RINGING

Filed Feb. 24, 1959 4 Sheets-Sheet 1

INVENTOR.
R.W. HUTTON
BY [signature]
ATTORNEY

CONNECTOR WITH AUTOMATICALLY CONTROLLED RINGING

Filed Feb. 24, 1959 4 Sheets-Sheet 3

CONNECTOR WITH AUTOMATICALLY CONTROLLED RINGING

Filed Feb. 24, 1959

United States Patent Office 3,085,133
Patented Apr. 9, 1963

3,085,133

CONNECTOR WITH AUTOMATICALLY CONTROLLED RINGING

Robert W. Hutton, Oak Lawn, Ill., assignor to International Telephone and Telegraph Corporation, New York, N.Y., a corporation of Maryland Filed Feb. 24, 1959, Ser. No. 795,252
12 Claims. (Cl. 179—18)

This invention relates to connectors for use in telephone systems and more particularly to connectors with automatically controlled ringing.

It is old in the art of telephony to signal by means of distinctive ringing currents. For example, interrupted, alternating current ringing signals may be projected over subscriber lines to operate ringers. Also, it is old to provide signals in the form of timed periods of ringing current to operate special purpose devices, such as signals at switchboards, certain toll equipment, and the like. For example, any suitable "splash" or period of ringing current, such as 400 milliseconds, or the like, may be used to operate a specific signal relay.

In the past, complicated timing and control circuits have been provided to measure and apply such a 400 milliseconds period of ringing current, thus necessitating not only equipment for signalling subscriber lines but also added equipment of unique design to signal special devices. There has been a need for signalling equipment of such a flexible design that it can be used generally to provide both the timed ringing pulses or "splashes" that are required to signal special purpose devices and the conventional interrupted ringing currents that are needed to signal called subscriber stations without unduly delaying the establishment of a connection.

An object of this invention is to provide new and improved signalling circuits.

Another object of this invention is to provide connectors having controls for extending ringing currents to a variety of equipment.

A further object of the invention is to provide for automatically transmitting, first, a timed pulse or "splash" of signalling current suitable for immediately signalling the called subscriber station responsive to the completion of a connection thereto, or for operating specific devices, and then conventional interrupted ringing current to signal called subscriber stations.

In accordance with this invention these and other objects are accomplished by connector equipment wherein any suitable stepping or sequence device is designed, first, to cause a tens selection and then a units selection after which the sequence device is operated automatically responsive to a predetermined number of cyclically recurring pulses to measure a period of time during which ringing current is transmitted continuously to apply immediate ringing current to signal the called party or to operate any special devices to which the connector may have been directed. Thereafter, the sequence device operates to apply interrupted ringing current in a usual manner.

The above mentioned and other objects of this invention together with the manner of obtaining them will become more apparent and the invention itself will be best understood, by making reference to the following description of an embodiment of the invention taken in conjunction with the accompanying drawings wherein.

Figure 1:
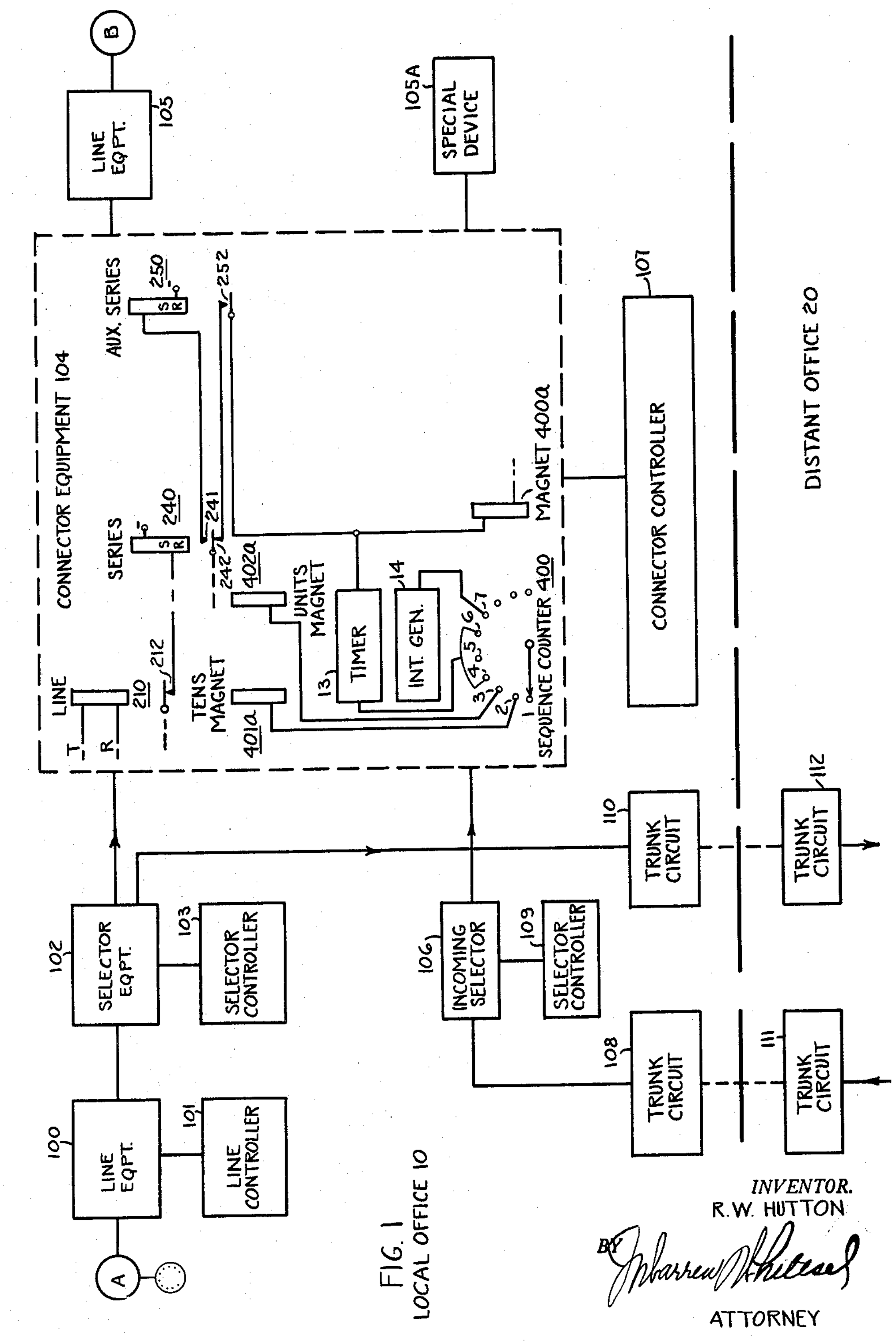
FIG. 1 shows by block diagram a telephone system which may utilize the subject invention.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. To illustrate, in FIG. 1 of the attached drawings dashed-line rectangle 104, indicates the portion of the system which is shown in detail in FIGS. 2–4. The remaining blocks of FIG. 1 are shown by solid-line rectangles indicating that any well known items may be used by those skilled in the art, such as step-by-step equipment, rotary equipment, crossbar equipment or the like. The detailed drawings illustrate counting means 400—402 in the form of electromagnetic counters, such as those shown in U.S. Patent Nos. 2,538,817, 2,538,818 and 2,538,819, granted on January 23, 1951, to John I. Bellamy and assigned to the assignee of this invention. Whereas other means, such as counting chains of gas tubes or transistors, minor switches, or the like may be used. Quite obviously, still other examples could be selected to illustrate the manner in which the specific terms that have been used are entitled to a wide range of equivalents.

Figures 4, 5:
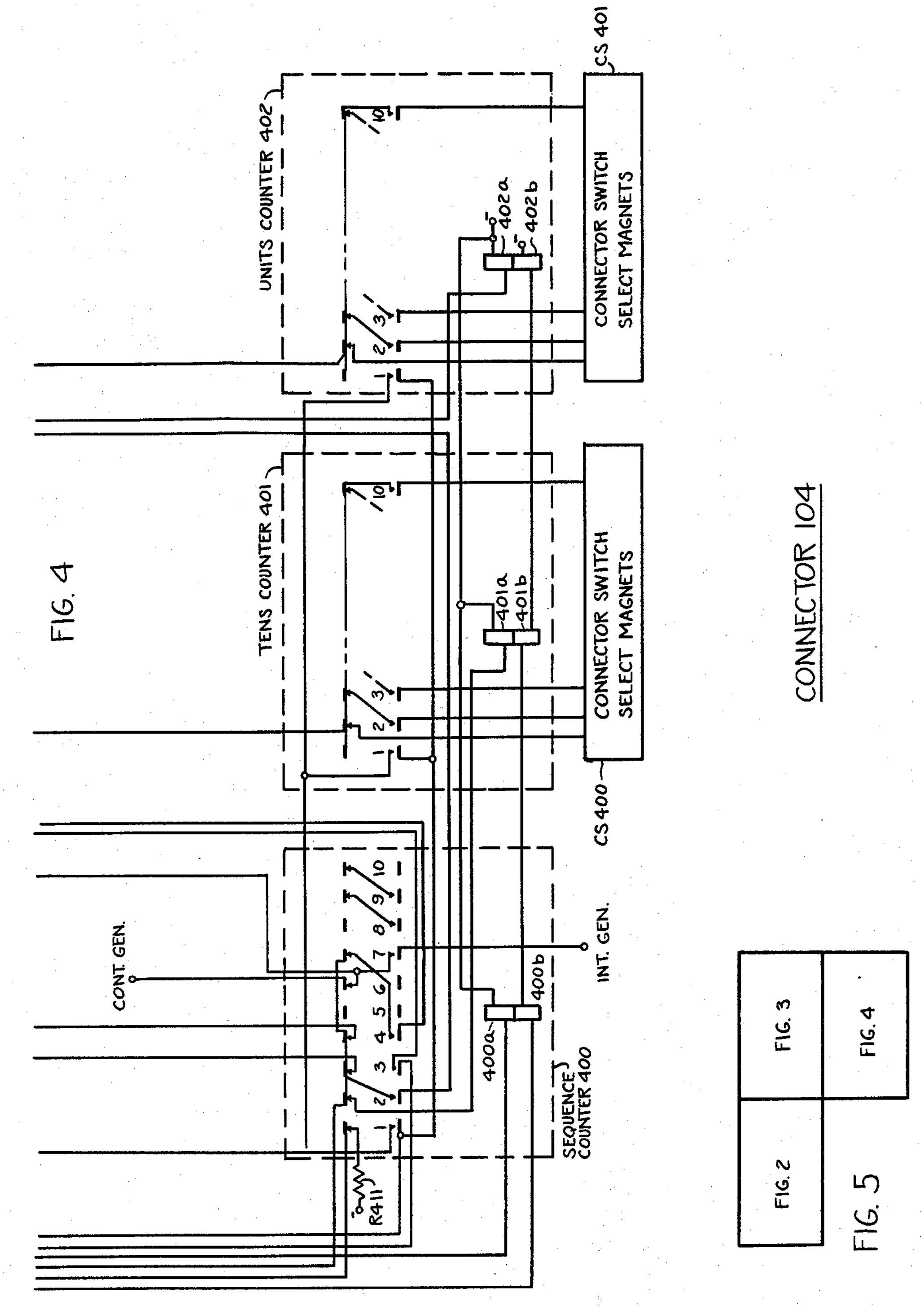
FIG. 5 shows the manner in which FIGS. 2–4 should be joined to provide a complete circuit.

The above mentioned magnetic counters are shown in FIG. 4—item 400, for example. Each counter is provided with two banks of contacts one of which is normally closed and the other of which is normally open. When the counter is standing in an unoperated condition the contacts marked "1" are prepared so that current in winding 400*a* generates magnetic flux to move an arm and associated mechanical linkage (not shown) to open upper contacts "1" while closing lower contacts "1" and preparing contacts "2". Residual magnetism then holds such arm in an operated position. In a similar manner each ensuing energization of winding 400*a* operates contacts that were prepared by a previous energization pulse and prepares contacts to be operated by a following pulse. After the counter's function is completed, current in winding 400*b* removes the residual magnetism and all contacts are released. The foregoing assumes for purposes of description that the linkage is provided on the basis of a single contact operation. Actually, however, the linkage may provide for operating any number of contacts in any sequence. For example, contacts 1–3 may operate on the first pulse, contact 4 on the second pulse and contacts 5–10 on the third pulse, etc.

BRIEF DESCRIPTION

The invention is shown in FIG. 1 as part of a telephone system depicted generally by means of hollow boxes. While those skilled in the art may use any suitable equipment to supply the functions indicated by such boxes, the detailed drawings (FIGS. 2–4) relate to a crossbar system similar to that shown in a copending application filed by E. J. Leonard et al., S.N. 629,282, on December 16, 1956, and assigned to the assignee of the subject invention, now U.S. Patent No. 2,918,533 issued December 22, 1959.

In FIG. 1, a calling subscriber at station "A" initiates a call by removing a receiver or handset whereupon a loop is completed at hookswitch contacts (not shown) in a conventional manner for causing line controller 101 to co-operate with line equipment 100 to find and seize the calling subscriber line.

Dial tone is returned and the calling subscriber at station "A" manipulates a device such as a dial or key-set according to the directory number of a called station, a special device, a distant office or the like. Selector equipment 102 and selector controller 103 respond to digit pulses to extend the call as, for example, to distant office 20 via trunk circuits 110 and 112 or to connector 104.

Assuming that connector 104 is seized, any suitable sequence counter 400 may be effective on step 2 for coupling tens magnet 401*a* to be controlled by a tens digit pulse train. Line relay 210 is connected to talking conductors T and R to be operated responsive to the tens digit pulse train that is transmitted from calling station "A". Responsive to each digit pulse that is received, line relay 210 releases to close contacts 212 and energize series relay 240 which in turn closes contacts 241 to operate auxiliary series relay 250. Since contacts 212 are opening and closing responsive to digit pulses, series relay 240 depends on its own slow release characteristics to hold it operated. After the tens digit pulse train ends relay 240 falls to open a circuit at contacts 241 for de-energizing auxiliary series relay 250. During the slow release time thereof, a circuit is completed via contacts 241 and 252 to operate sequence device or counter magnet 400*a*. Responsive to such operation, a circuit is completed at contacts 3 of counter 400 to render the units digit pulse train effective after which series relays 240 and 250 release as explained above to advance sequence counter 400 to step 4. Next, timer 13 takes over control of magnet 400*a* and sequence counter 400 is automatically driven over steps 4–6 to measure a time period during which continuous ringing current is transmitted to signal the called subscriber line or to signal special device 105*a* if the call is so directed. After a signal in special device 105*a* is operated, it locks 105*a* and the interrupted ringing current which follows has no further effect.

Following the automatic operation of sequence counter 400 to step 7, interrupted ringing current supplied by generator 14 may be extended to signal called subscriber station "B", if the call is so directed. Insofar as the subscriber at station "B" is concerned, he hears intermittent ringing until the call is answered. Most likely he is completely unaware of the fact that the first burst of ringing may be a little longer or a little shorter than other bursts which he hears later.

Incoming calls from distant office 20 are handled in a similar manner except that they are extended by trunk circuits 111 and 108 through incoming selector 106 to connector 104 which responds in the manner described above relative to local calls.

DETAILED DESCRIPTION

Figure 2:
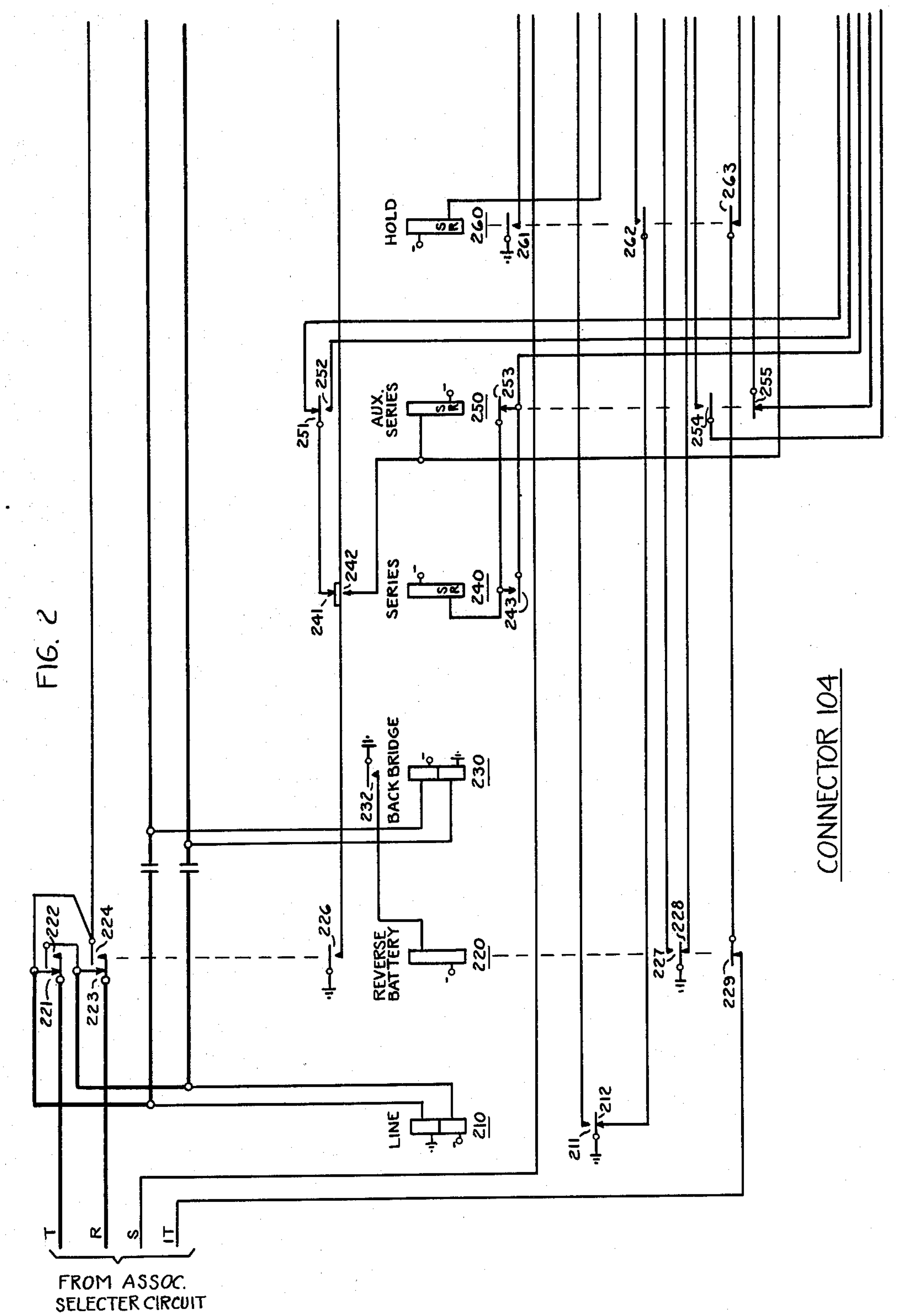
FIGS. 2–4 show details of a connector which is also indicated in FIG. 1 by means of dashed-line rectangle 104.
Figure 3:
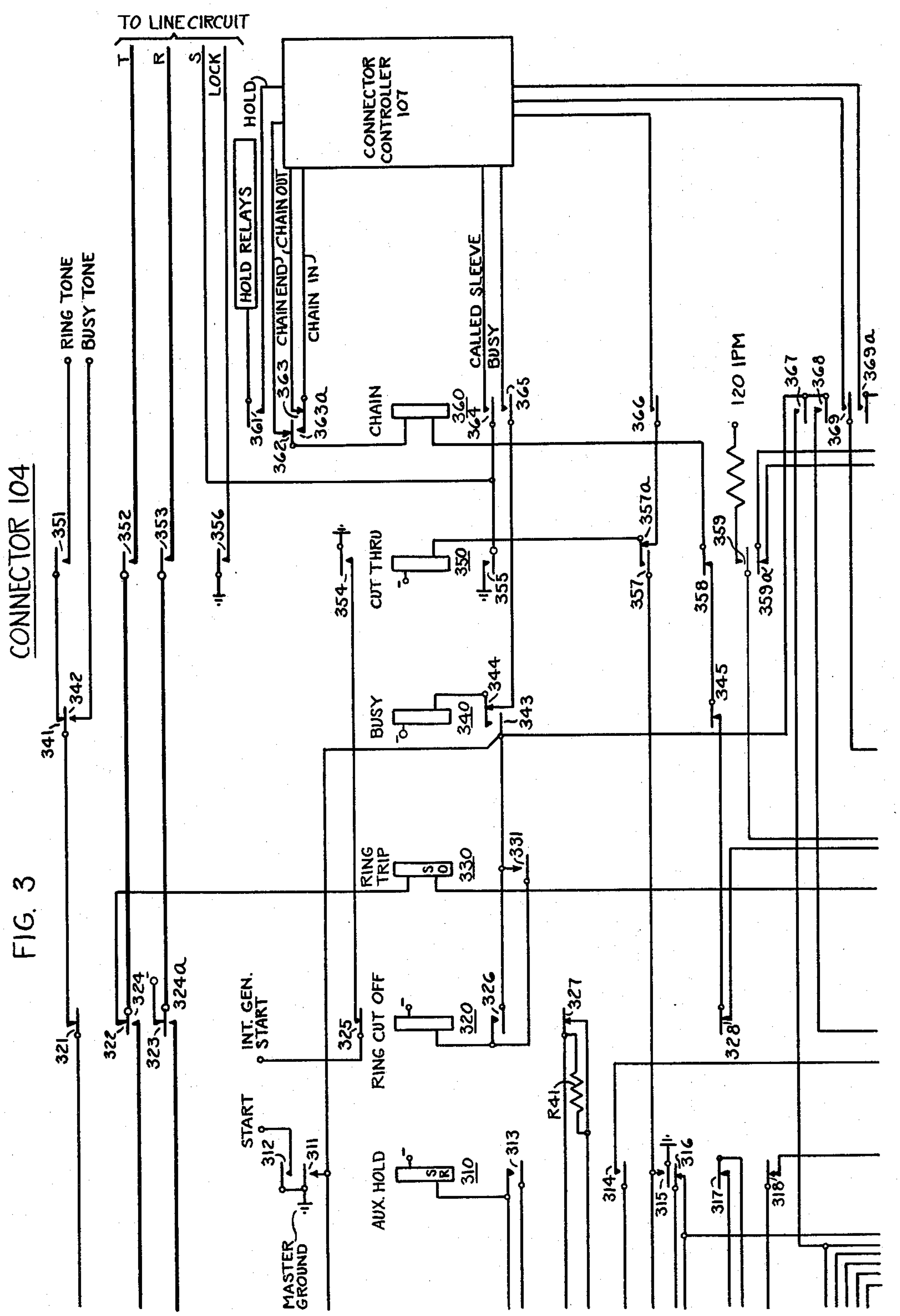

Next, reference is made to FIGS. 2–4 for a detailed explanation of how the circuit operates.

*Seizure.*—A preceding circuit may seize connector 104 when it is marked idle by battery extended through resistance R411, upper sequence counter contacts 1, relay contacts 255, 317, 263, and 229 to conductor IT. Responsive thereto, a loop is completed by any suitable means (not shown) across conductors T and R of FIG. 2 for operating line relay 210 over a circuit which may be traced from battery through the lower winding of line relay 210, contacts 223, conductor R, equipment (not shown) extending to the calling subscriber station, conductor T, contacts 221, and the upper winding of line relay 210, to ground. Line relay 210 operates to prepare for the receipt of digit pulses and to initiate circuit operations within connector 104.

Responsive to the operation of line relay 210, contacts 211 close to operate hold relay 260 over the circuit extending from ground through contacts 211, 327, and the winding of relay 260 to battery.

Responsive to the operation of hold relay 260, contacts 261 close to extend an operating circuit from ground through the winding of relay 310, to battery, thus causing its operation. Contacts 262 have no effect at this time. Contacts 263 open to remove the idle line marking.

Responsive to the operation of relay 310, contacts 311 close to apply master ground. As its name implies, the master ground marking is the potential to which most equipment in connector 104 locks; therefore, the circuit is released when master ground is removed. Also responsive to the operation of relay 310, contacts 312 close to mark a conductor designated "Start" for operating any common equipment as required for completion of the call. Contacts 313 close to mark sleeve conductor S (FIG. 2) with a holding ground potential. Contacts 314—318 have no effect at this time.

Nothing further happens until digit pulses are received.

*Dialing*

Any suitable form of pulsing may be used; however, the drawings contemplate "loop" pulsing which means that equipment such as a telephone dial opens and closes a connection across conductors T and R a certain number of times depending upon the numerical value of a digit that is dialed. Since line relay 210 is held operated by such connection, it releases and reoperates responsive to each pulse.

*Tens digit.*—The first time that contacts 212 close, tens counter 401 operates over a circuit which may be traced from ground through contacts 212, 262, 314, upper sequence counter contacts 3 and 2, and upper winding 401*a* to battery. A circuit is also closed for operating series relay 240 over a path that may be traced from battery through the winding of series relay 240, contacts 253, upper sequence counter contacts 2 and 3, contacts 314, 262, and 212 to ground.

Responsive to the first operation of sequence counter 400, upper contacts 1 open to break a second point in the idle marking circuit and lower contacts 1 close to prepare for operation of auxiliary series relay 250.

Responsive to the operation of series relay 240, contacts 242 close to operate auxiliary series relay 250 over a circuit which may be traced from battery through the winding of relay 250, contacts 242 and 311 to master ground. Contacts 243 close to complete a locking circuit which extends from battery through the winding of series relay 240, contacts 243, upper sequence counter contacts 3, contacts 314, 262 and 212 to ground.

When auxiliary series relay 250 operates, it closes contacts 252 to prepare a driving path for sequence counter 400—such path not being effective at this time since contacts 241 are now standing open. Contacts 253 open without effect since contacts 243 are now closed. Contacts 254 close to prepare for release of the various counters as explained later. Contacts 255 open still another point in the idle marking path.

At the end of the first pulse, the loop across the conductors T and R is reclosed; whereupon, line relay 210 reoperates and closes contacts 211 to re-energize hold relay 260. Contacts 212 open to de-energize series relay 240 which continues to hold throughout an entire digit pulse train due to its own slow release characteristics. Also responsive to the operation of contacts 212, the upper winding of tens counter 401 is deenergized.

Each pulse that is received thereafter causes line relay 210 to release and reoperate. Responsive thereto, contacts 212 close to operate tens counter magnet 401 once for each pulse as it is received, thereby operating the various tens counter contacts in sequence. After all of the tens digit pulses are received, tens counter 401 is left standing with particular contacts operated depending upon the numerical value of the digit that was dialed by the calling subscriber, thus preparing a particular connector switch select magnet. For example, if it is assumed that two steps have been taken by tens counter 401, a circuit may be traced from connector controller 107 through contacts 369 (now open), upper tens counter contacts 3, a cross connection strapping, and lower tens counter contacts 2 to connector select magnet CS400.

After the last tens digit pulse is received, contacts 212 remain open for a period of time which is longer than the release time of series relay 240 which thereupon releases to mark the end of the tens digit pulse train.

Responsive to the release of series relay 240, contacts 241 close to complete a circuit extending from master ground through contacts 311, 241, 252, and sequence counter magnet 400a, to battery. The internal mechanical linkage (not shown) of sequence counter 400 is arranged so that upper contacts 1 and 2 open and lower contacts 1 and 2 close responsive to the first energization of magnet 400a. Also responsive to release of series relay 240, contacts 242 open to de-energize auxiliary series relay 250 which continues to hold for a predetermined period of time, owing to its own slow release characteristics. After the slow release period expires, auxiliary series relay 250 releases to open contacts 252 and de-energize winding 400a.

Upper and lower sequence counter contacts 1 have no effect at this time. Upper sequence counter contacts 2 open and lower contacts 2 close to transfer the drive path from tens counter magnet 401a to units counter magnet 402a.

The circuit is now standing ready to receive the next digit pulse train.

*Units digit.*—The circuit responds to the units pulses in a manner similar to that described above in connection with the tens pulses. That is, line relay 210 releases and reoperates responsive to each digit pulse as it is received. Hold relay 260 and auxiliary hold relay 310 depend upon their slow release characteristics to hold them operated throughout a digit pulse train. Throughout each digit pulse train, series relay 240 and in turn auxiliary series relay 250 hold responsive to their slow release characteristics.

Responsive to the receipt of each digit pulse, contacts 212 close to complete a circuit to the units counter magnet as follows: Ground, contacts 212, 262, 314, upper sequence counter contacts 3, lower operated contacts 2, and operated units counter magnet 402a to battery. Thus, units counter 402 steps responsive to each digit pulse as it is received, thereby closing a circuit to select a particular magnet in the group marked CS401. For example, if two pulses are received, upper contacts 1–2 are standing open and lower contacts 1–2 are standing closed. Hence, a circuit is prepared from connector controller 107 through contacts 369a (now open) upper units counter contacts 3 and lower contacts 2 to a particular select magnet.

At the end of the units digit pulse train, contacts 212 remain open for a period of time that is longer than the release time of series relay 240 which therefore releases.

Responsive to the release of series relay 240, contacts 242 open a circuit to de-energize auxiliary series relay 250 which continues to be held for a period of time due to its own slow release characteristics. During such time, an operate circuit may be traced from ground through contacts 311, 241, 252 and sequence counter magnet 400a to battery.

Responsive to the operation of sequence counter 400, its upper contacts 3 open and lower contacts 3 close. Upper contacts 3 break the drive path which was effective during the receipt of units digit pulses which extended from the lower contacts 212 of line relay 210. Lower contacts 3 close to prepare a chain circuit leading to chain relay 360.

After a brief period of time following the release of series relay 240 and resulting operation of contacts 242, the slow release time period for auxiliary series relay 250 expires; therefore, it releases. Responsive thereto connector controller 107 is seized upon completion of a circuit which may be traced from master ground on contacts 311 through contacts 241, 251, lower sequence counter contacts 3, contacts 328, 345, 358, the winding of chain relay 360, contacts 362, and the conductor marked "Chain End" to connector controller circuit 107. If the connector controller circuit is not busy, a battery marking is on the conductor marked "Chain End" and chain relay 360 operates.

Responsive to the operation of chain relay 360, contacts 363 open to separate the conductors designated "Chain Out" and "Chain In," thereby preventing a seizure of the common connector control circuit 107 by any other equipment. When contacts 363a close, chain relay 360 locks to the conductor designated "Chain In." Contacts 368 close to operate series relay 240 over a circuit which may be traced from master ground at contacts 311 through contacts 368, upper sequence counter contacts 4, 3, and 2, contacts 253 and the winding of series relay 240 to battery. Contacts 367 close to hold chain relay 360 after contacts 251 open, the locking path extending from master ground at contacts 311 through contacts 367, lower sequence counter contacts 3, contacts 328, 345, 358, the winding of chain relay 360, and contacts 363a to the conductor designated "Chain In." Contacts 361, 364—366, 369 and 369a close to interconnect controller 107 and various circuits in connector 104 after which circuit operations are controlled automatically in a proper sequence by connector controller 107.

Controller 107 applies a ground potential via contacts 369 and 369a to operate particular select magnets among the groups CS400 and CS401 in accordance with the position to which counters 401 and 402 were driven, as explained above. Next, controller 107 applies ground to the conductor designated "Hold" for operating connector hold relays via contacts 361. Thus, the crosspoints through which the call is extended are established. When relay 240 operates, as explained above, contacts 242 close thereby operating auxiliary series relay 250 from master ground at contacts 311.

*Busy test.*—If the called line is busy, call sleeve conductor S (FIG. 3) is marked in any suitable manner. Responsive thereto, ground is returned from controller 107 over the conductor marked "Busy" through contacts 365, 344 and the winding of relay 340 to battery. Responsive to the operation of busy relay 340, contacts 342 close to return a busy tone to signal the calling subscriber via a circuit including contacts 321, 221, and conductor T. Contacts 343 close to lock busy relay 340 to master ground at contacts 311. Contacts 344 open to break the original operating path for busy relay 340, while contacts 345 open to release chain relay 360, thereby releasing connector controller 107. Since cut-through relay 350 does not operate on calls to busy lines, contacts 352 and 353 remain open and the calling subscriber line is not extended beyond this point.

*Idle line.*—Assuming next that the called line is idle when tested, cut-through relay 350 operates when ground is returned from connector controller 107 via contacts 366 and 357a. Responsive to the operation of cut-through relay 350, contacts 351 close to apply ringing tone over a circuit including contacts 341, 321, 221, and conductor T, thus indicating to the calling party that the called party is being signalled. Contacts 352 and 353 close to extend the heavily inked talking conductor; however, contacts 324 and 324a are standing open at this time so that the calling subscriber does not hear ringing current. Contacts 354 close to start an interrupted ringing current generator. Contacts 355 close to apply a busy ground marking to sleeve conductor S and to hold any connected equipment. Contacts 356 close to mark the conductor designated "Lock." Contacts 357 open to break the circuit over which cut-through relay 350 originally operated; however, it has already locked at its make before break contacts 357 to ground via contacts 315, and 227. Contacts 358 open the hold circuit for chain relay 360 which falls to release connector controller 107. Contacts 359 close to apply the output of a 120 i.p.m. interrupter via closed lower sequence counter contacts 4, upper contacts 7, 4, 3 and 2 to series relay 240 through contacts 243. Contacts 359a open to prevent any feedback which may tend to operate units counter 402.

*Ringing.*—Responsive to the release of chain relay 360 (as explained above) contacts 368 open to break a circuit to series relay 240 which formerly extended from battery through the winding of series relay 240, contacts 243, upper sequence counter contacts 2–4, contacts 368 and 311 to master ground.

Responsive to the release of series relay 240, contacts 242 open to de-energize series auxiliary relay 250 which continues to hold its operated condition for a short period of time due to its own slow release characteristics. During such time, a circuit is closed from master ground at contacts 311 through contacts 241, 252, and magnet 400*a* to battery, whereupon sequence counter 400 steps to its fourth step.

Means in the form of a 120 i.p.m. interrupter is provided to generate cyclically recurring pulses for operating sequence counter 400 automatically to measure a predetermined time period. More particularly, after sequence counter 400 operates to its fourth step, upper contacts 4 open to break a path over which series relay 240 operated under the control of chain relay 360. Lower sequence counter contacts 4 close to complete a circuit from the 120 i.p.m. interrupter through contacts 359, lower sequence counter contacts 4, upper contacts 7, 4, 3 and 2, contacts 253 and the winding of series relay 240 to battery. Series relay 240 and in turn auxiliary series relay 250 operate as explained above. At the end of the first pulse from the 120 i.p.m. generator, series relay 240 and its slow release slave relay 250 release. A circuit is completed during the slow release time of auxiliary series relay 250 for operating sequence counter 400, all in the manner explained above. In a similar manner, sequence counter 400 is operated one step responsive to each pulse from the 120 i.p.m. interrupter.

Means is provided for transmitting continuously applied ringing current for a predetermined period of time. In greater detail, after cut-through relay 350 closes contacts 352, continuous ringing current is supplied over a circuit which may be traced from the "Cont. Gen." conductor (FIG. 4) through upper sequence counter contacts 6, the winding of ring trip relay 330, contacts 322, 352, conductor T and a loop (not shown) extending to the called line and return over conductor R, contacts 353, and 323 to battery. By applying continuous ringing current for a time interval immediately upon establishment of a connection to the called party, the holding time of the connection is decreased because the subscriber is rung immediately; whereas, in some systems which rely only on interrupted ringing current, the subscriber might be rung as much as two and one-half seconds after the connection is established if established between the ringing pulses. After a suitable number of pulses have been applied by the 120 i.p.m. interrupter, sequence circuit 400 is operated to the sixth step whereupon the conductor marked "Cont. Gen." is disconnected at the sixth upper set of contacts, thereby terminating the measured time period during which continuous ringing current was transmitted over the called line.

Responsive to the next pulse that is received from the 120 i.p.m. generator, sequence counter 400 operates to its seventh step whereupon the upper armature opens to break the automatic stepping circuit and the seventh lower set of contacts closes to supply conventional interrupted ringing current for signalling the called subscriber in a usual manner.

Briefly, in resume, after an idle called line was seized, cut-through relay 350 operated its contacts 353 and 352 to complete a circuit for applying ringing current during a period of time that was measured by the joint action of the 120 i.p.m. interrupter and relays 240 and 250 as they co-operated to step sequence counter 400 for a predetermined number of steps. At the end of the measured time period, the continuous ringing current was removed and normal interrupted ringing current was applied. Thus, a measured pulse of steady ringing current was applied immediately to signal a called subscriber or to operate any desired switching equipment (not shown) after which the normal interrupted ringing current was applied to signal a called subscriber in a typical manner.

*Answer*.—When the call is answered, a loop is closed between conductors T and R of FIG. 3, whereupon a circuit is completed for operating ring trip relay 330, as follows: The conductor marked "Int. Gen." (FIG. 4), the lower seventh armature of sequence counter 400, the winding of ring trip relay 330, contacts 322, 352, conductor T, a loop (not shown) including the called subscriber line and return over conductor R, contacts 353 and 323 to battery.

Responsive to the operation of ring trip relay 330, contacts 331 close to operate ring cutoff relay 320 over a circuit which may be traced from battery through the winding of relay 320, contacts 331 and 311 to master ground.

Responsive to the operation of ring cutoff relay 320, contacts 326 close to lock relay 320 over a circuit extending through contacts 311 to master ground. Contacts 321 open to remove the ringing tone that was extended to the calling subscriber, while contacts 322 and 323 open to remove the ringing current that was extended to signal the called subscriber and further to release ring trip relay 330. Contacts 324 and 324*a* close to interconnect the calling and called talking conductors T and R. Contacts 325 open to stop the interrupter ringing current generator if no other call is then in progress. Contacts 327 open; however, hold relay 260 remains in its operated condition with resistor R41 reducing the current drain required thereby. Contacts 328 open a point in the circuit to chain relay 360 without effect at this time.

When ring cutoff relay 320 closed contacts 324 and 324*a*, as explained above, a circuit is completed to operate back bridge relay 230 as follows: Ground through the lower winding of relay 230, contacts 324*a* and 353 to the calling subscriber station and return via contacts 252, 324, and the upper winding of relay 230 to battery. The circuit just traced not only operates back bridge relay 230, but also furnishes talking battery to the calling subscriber.

Responsive to the operation of back bridge relay 230, contacts 232 close to operate reverse battery relay 220 over an obvious circuit. Responsive thereto, contacts 221–224 operate to reverse the direction of battery flow over the circuit including the calling loop (conductors T and R, FIG. 2), thus extending an answer supervision signal in the well known manner.

The call is now in progress and nothing further happens until it is released.

*Release (calling party hangs-up first)*.—When the calling party hangs-up, a loop across conductors T and R (FIG. 2) is broken at hookswitch contacts (not shown); whereupon, line relay 210 releases. Responsive thereto, contacts 211 open to restore hold relay 260 and in turn contacts 261 open to restore the preceding equipment by removing the ground potential from sleeve conductor S (FIG. 2) and to de-energize slow release auxiliary hold relay 310. After a brief interval, relay 310 restores and contacts 311 open; however, master ground is not removed since contacts 226 are supplying an alternate master ground under the influence of the loop that is completed at the called party's hookswitch contacts. Contacts 312 remove ground from the conductor marked "Start." Contacts 316 prepare a path extending to the release windings 400*b*, 401*b* and 402*b*.

Responsive to disconnect by the called party, a loop across conductors T and R (FIG. 3) breaks to release back bridge relay 230. Responsive thereto, contacts 232 open and reverse battery relay 220 restores to remove master ground at contacts 226; whereupon, the circuit is finally released. Contacts 228 close to complete a circuit from ground through contacts 316, lower sequence counter contacts 1, contacts 318 and the winding of auxiliary series relay 250 to battery. When relay 250 operates, a circuit is closed for energizing the lower or reset windings of the counters, as follows: Battery, lower windings 402*b*, 401*b*, and 400*b* in series, contacts 254, 316 and 228 to ground. Each of the counters is now restored to its normal condition.

It is thought that the manner in which the circuit is released when the called party disconnects first is obvious from the foregoing discussion.

CONCLUSION

While the foregoing description relates to a specific embodiment of the invention, it is thought that those skilled in the art may readily substitute other devices for those described. Therefore, it is to be clearly understood that this description is made only by way of example and not as a limitation on the scope of the appended claims.

I claim:

1. In a telephone system, means for extending calls through said telephone system, means responsive to a plurality of digit pulse trains for operating said call extending means, means comprising a sequence device for directing at least some of said digit pulse trains to control the extension of said calls through said telephone system, means for generating cyclically recurring pulses, means responsive to said cyclically recurring pulses for operating said sequence device to measure a predetermined period of time after the extension of said call, means for transmitting continuously applied ringing current through at least part of said telephone system for the duration of said predetermined time period, and means responsive to further operation of said sequence device for transmitting interrupted ringing current through at least part of said telephone system.

2. The telephone system of claim 1 wherein said means for directing said pulse trains comprises; means operative for the duration of at least some of said digit pulse trains to mark the beginnings and ends thereof, means responsive to said last named means for operating said sequence device at the ends of individual ones of said pulse trains, and circuit means controlled by said sequence device for coupling individual ones of said digit pulse trains to direct said call extending means.

3. The telephone system of claim 2 wherein said means for marking said beginnings and ends of digit pulse trains comprise a slow release relay, and said means for operating said sequence device at the ends of said digit pulse trains comprises means rendered effective during the slow release time of said relay.

4. The telephone system of claim 2 wherein said means for measuring said predetermined period of time comprises; means responsive to said operation of said sequence device at the end of a particular digit pulse train for coupling said generating means to control automatic operation of said sequence device responsive to a predetermined number of said recurring pulses, and means effective after the occurrence of said predetermined number of recurring pulses for stopping said automatic operation of said sequence device.

5. In a telephone system, subscriber lines having signalling means normally operative responsive to interrupted ringing current, special devices having signalling means normally operative responsive to continuous ringing current which is applied for a measured time period, connector means for selectively extending calls responsive to at least two digit pulse trains either to said subscriber lines or to said special devices, sequence means for rendering each of said digit pulse trains individually effective to control said connector means, means for thereafter operating said sequence means to measure a predetermined period of time, means responsive to said last named means for continuously transmitting ringing current during said predetermined period of time, and means responsive to still further operation of said sequence means for thereafter transmitting interrupted ringing current.

6. The telephone system of claim 5 wherein said sequence means comprises; means operative for the duration of each of said digit pulse trains to mark the beginnings and ends thereof, and means responsive to said last named means for applying each of said digit pulse trains individually to operate said connector means.

7. The telephone system of claim 5 wherein said sequence means comprises; means including a slow release relay operative for the duration of each of said digit pulse trains to mark the beginnings and ends thereof, and means effective during the slow release time of said relay for completing a circuit to render the next digit pulse trains individually effective.

8. The telephone system of claim 5 wherein said means for measuring said period of time comprises means for generating cyclically recurring pulses, means effective after a particular one of said digit pulse trains to couple said generating means for automatically operating said sequence means responsive to a predetermined number of said recurring pulses, and means effective after the occurrence of said predetermined number of recurring pulses for stopping said automatic operation of said sequence means.

9. In a telephone system, means for transmitting digit pulse trains through said telephone system to direct the operation thereof, means operative for the duration of at least some of said digit pulse trains to mark the beginnings and ends thereof, stepping means operative responsive to said last named means for sequentially rendering at least some of said pulse trains individually effective, means for thereafter automatically operating said stepping means to measure a predetermined period of time, means for transmitting continuously applied ringing current during said predetermined period of time, and means responsive to further operation of said stepping means for transmitting interrupted ringing current.

10. The telephone system of claim 9 wherein said means for automatically operating said stepping means comprises; means for generating cyclically recurring pulses, means responsive to a particular operation of said stepping means for connecting said generating means to operate said stepping means automatically responsive to a predetermined number of said recurring pulses, and means effective after the occurrence of said predetermined number of recurring pulses for stopping said automatic operation of said stepping means.

11. The telephone system of claim 9 wherein said means for marking the beginnings and ends of digit pulse trains comprises at least one slow release relay, and said means for operating said stepping means comprises a circuit rendered effective during the slow release of said relay.

12. The telephone system of claim 11 wherein said means for automatically operating said stepping means comprises; means for generating cyclically recurring pulses, means responsive to a particular operation of said stepping means for connecting said generating means automatically to operate said stepping means responsive to a predetermined number of said recurring pulses, and means effective after the occurrence of said predetermined number of recurring pulses for stopping said automatic operation of said stepping means.

References Cited in the file of this patent

UNITED STATES PATENTS

| | | |
|---|---|---|
| 1,251,504 | Goodrum | Jan. 1, 1918 |
| 1,373,624 | Martin | Apr. 5, 1921 |
| 1,383,802 | Goodrum | July 5, 1921 |
| 2,274,715 | Lomax | Mar. 3, 1942 |